March 14, 1933.  H. O. LINDGREN  1,901,461
CENTRIFUGAL SEPARATOR MACHINE
Filed Sept. 18, 1931
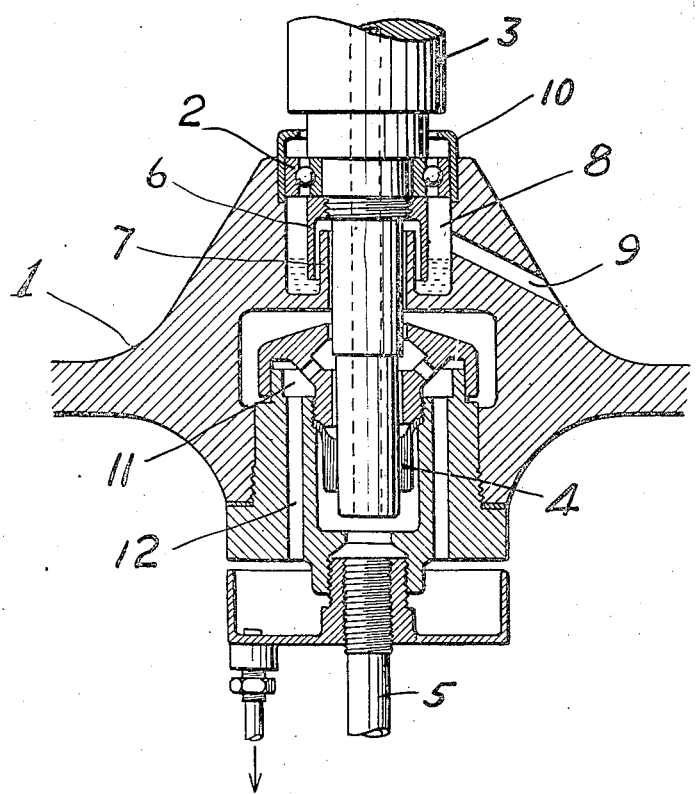
WITNESS:
INVENTOR
Hans Olof Lindgren
BY
ATTORNEYS.

Patented Mar. 14, 1933

1,901,461

UNITED STATES PATENT OFFICE

HANS OLOF LINDGREN, OF APPELVIKEN, SWEDEN, ASSIGNOR TO AKTIEBOLAGET SEPARATOR, OF STOCKHOLM, SWEDEN, A CORPORATION OF SWEDEN

CENTRIFUGAL SEPARATOR MACHINE

Application filed September 18, 1931, Serial No. 563,541, and in Sweden November 8, 1930.

In purifying certain types of liquids, such as, for instance, transformer oils, it is important that access of air to the liquid be prevented as much as possible. For this purpose liquid is fed to the separator bowl through a hollow spindle carrying the separator bowl, that end of the spindle which is remote from the bowl being connected to a suitable tightening device, which must be very efficient because it must establish and maintain a tight joint between a stationary part (a liquid supply pipe) and a rapidly revolving spindle vibrating in radial direction. Owing to the vibrations it is difficult to wholly prevent the liquid from leaking through the tightening device. In separators of the type referred to, a bearing is provided above the tightening device, the purpose of the bearing being to carry the spindle. Over this bearing is the lower portion of the interior of the separator frame, the lowermost part of which forms a container for oil, adapted to lubricate the rotating members and the bearings. The risk of liquid leaking through the tightening device also involves the risk that the liquid leaking out may penetrate up through the bearing and enter the oil container. The oil will in such case be diluted and its lubricating properties reduced, and, besides, the bearing will become damaged by the humidity. It is also of importance to prevent oil from leaking down from the bearing through the tightening device, as otherwise such oil may become mixed with the liquid to be separated, thus contaminating the latter.

The present invention is intended for use in connection with centrifugal separators provided with bored spindles for the supply and the discharge of liquid and having a bearing arranged above a tightening device, and has for its object to prevent oil coming into contact with the tightening device and also to prevent any liquid leaking through the tightening device from entering the bearing thereabove.

The figure of the attached drawing illustrates, in sectional elevation, one embodiment of the invention. In the separator frame 1 is a bearing 2 for the bored spindle 3 carrying the separator bowl. The lower portion of the spindle is embraced by a tightening device 4, comprising an elastic collar, one end of which is secured so that it makes a tight joint with the frame or with a special part provided in the frame. Liquid supplied through a pipe line 5 is thus forced to stream into the central hole of the spindle. Below the bearing 2 a collar 6, fixed on and rotating with the spindle, covers a stationary collar 7 secured to or integral with the frame. Oil leaking down through the bearing is, during the rotation of the spindle, thrown off by the said collar 6 and collected in a chamber 8 arranged around and below the collar 6, channels 9 extending from said chamber for carrying away the collected oil and, if desired, for conducting it back to the oil container in the frame.

Centrifuges of this type are generally driven by a screw and worm gear, the worm wheel as a rule extending down into an oil bath in the frame. During the rotation of the worm wheel oil is splashed about, by means of which the different bearings are lubricated. In order to avoid the passage down through the bearing of too much oil, it is suitable to provide, above the bearing, a collar 10, which may either rotate with the spindle or be fixed to the frame. In order to prevent the flow of oil down to the tightening device from the oil bath in the frame through the channels 9 when the machine is at a standstill, it is important that it be provided with devices for regulating the level in the oil bath. This can suitably be effected by a level outlet, such as that shown, which prevents the oil from rising to a height which would permit oil to flow down over the upper rim of the stationary collar 7 when the machine is not in operation.

The figure shows a chamber 11 for collecting oil which may flow down through the bearing thereabove. This chamber also collects liquid which may leak past the tightening joint around the spindle. From the chamber 11 extend channels 12 for conducting away liquid which is collected in the said chamber.

The above named devices can of course be utilized when either liquid to be separated or purified liquid passes through the boring of the spindle. The oil may also be supplied to the bearing from an oil bath in the frame or from separate lubricating devices.

The herein disclosed construction comprising the elastic collar 4, enclosed in a chamber affording free communication between pipe 5 and spindle 3, and confined at one end in fixed relation with such chamber, and having a free end subject to the pressure therein, thereby permitting such fluid pressure to maintain the free end of the collar in tightening relation with the spindle, is not herein claimed; the same forming the subject-matter of an application filed by me of even date herewith, Serial No. 563,539.

Having now fully described my invention, what I claim and desire to protect by Letters Patent is:

1. The combination, with a centrifugal bowl, a rotary spindle carrying the bowl and having an axial channel communicating with the interior of the bowl, a fixed pipe communicating with the spindle channel, a device positioned adjacent the end of the spindle communicating with the fixed pipe and adapted to maintain a substantially tight joint, and a bearing for the spindle between the bowl and said tightening device, of a collar between the bearing and said tightening device and rotating with the spindle, a stationary collar surrounding the spindle and surrounded by the rotary collar, and a third collar surrounding the spindle and arranged over the bearing and regulating the supply of oil thereto.

2. The combination, with a centrifugal bowl, a rotary spindle carrying the bowl and having an axial channel communicating with the interior of the bowl, a fixed pipe communicating with the spindle channel, a device positioned adjacent the end of the spindle communicating with the fixed pipe and adapted to maintain a substantially tight joint, and a bearing for the spindle between the bowl and said tightening device, of a collar between the bearing and said tightening device and rotating with the spindle, a stationary collar surrounding the spindle and surrounded by the rotary collar, means providing a chamber around said collars, said chamber having an outlet below the rim of the stationary collar so that oil flowing into the chamber cannot overflow said collar when the machine is not running, means providing another chamber between said collars and said tightening device for receiving any liquid which may leak past the same, and means for conducting away liquid which may flow into said chamber.

In testimony of which invention, I have hereunto set my hand, at Stockholm, Sweden, on this eleventh day of August, 1931.

HANS OLOF LINDGREN.